T. SCHERBA.
TROLLEY.
APPLICATION FILED APR. 17, 1912.
1,048,742.
Patented Dec. 31, 1912.
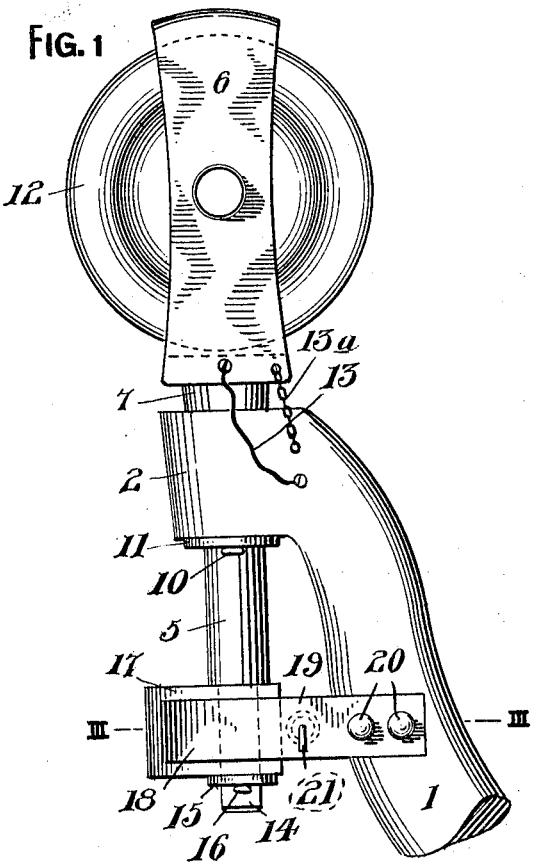
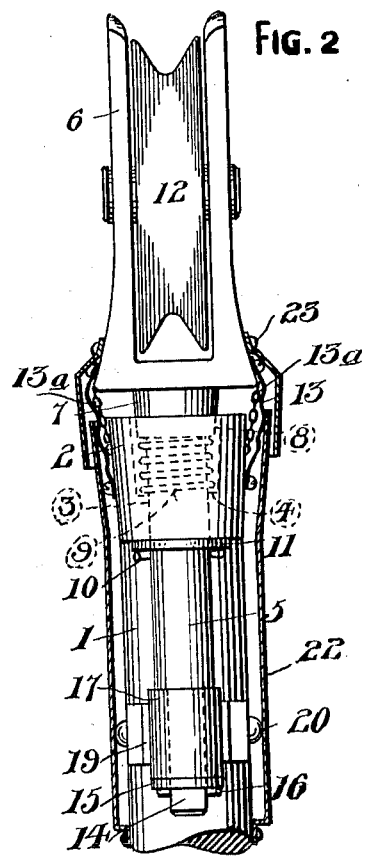
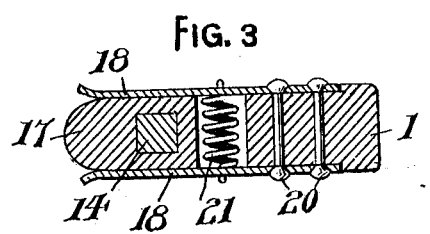
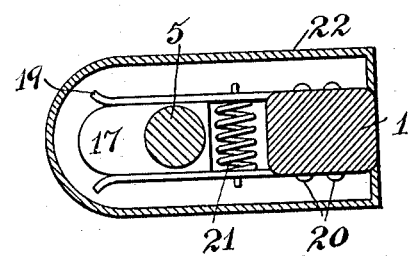
WITNESSES
INVENTOR
T. Scherba
BY
ATTORNEYS

UNITED STATES PATENT OFFICE.

TEODORE SCHERBA, OF PITTSBURGH, PENNSYLVANIA.

TROLLEY.

1,048,742.  Specification of Letters Patent.  Patented Dec. 31, 1912.

Application filed April 17, 1912. Serial No. 691,319.

*To all whom it may concern:*

Be it known that I, TEODORE SCHERBA, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and the primary object of my invention is to provide a swiveled harp that can accommodate itself to the movement of the wheel against a wire, rail, or other electric conductor, thereby preventing accidental displacement of the trolley due to curved sections of a trolley wire, irregularities in the same, or high speed of a trolley car.

Another object of this invention is the provision of novel means in connection with a swiveled trolley harp for retaining the same normally in alinement with a trolley harp.

A further object of this invention is to accomplish the above results by a yieldable swiveled trolley harp that is durable, inexpensive to manufacture, and highly efficient for high speed suburban railways.

These and such other objects as may hereinafter appear are attained by a mechanical construction that will be hereinafter specifically described and then claimed.

Reference will now be had to the drawing, wherein—

Figure 1 is a side elevation of the trolley. Fig. 2 is a rear elevation of the same. Fig. 3 is a horizontal sectional view taken on the line III—III of Fig. 1, and Fig. 4 is a horizontal sectional view centrally of the stem 5 and further showing a portion of the trolley pole in section as well as the casing 22.

The reference numeral 1 designates a portion of a trolley pole, and the upper end of the pole is provided with an integral horizontal socket 2 that has a vertical opening 3 with the upper end of said opening enlarged to provide an annular shoulder 4.

Rotatably mounted in the opening 3 is the stem 5 of a harp 6. The upper end of said stem being enlarged to provide an annular shoulder 8 confronting the shoulder 4 of the socket 2. Encircling the stem 5 between the shoulders 4 and 8 is a coiled compression spring 9.

Arranged upon the stem and retained thereon by a pin 10 is a washer 11, said washer limiting the upward movement of the stem 5 within the socket 2, but allowing the stem to be lowered and the spring 9 placed under tension. The spring 9 allows the harp to yield when irregularities are encountered in the trolley wire.

Revolubly mounted in the harp 6 is a trolley wheel 12 of the ordinary and well known type, to insure a positive electrical connection between the harp 6 and the pole 1, the sides of the harp 6 are connected by conductors 13 to the upper end of the pole.

The lower end of the stem 5 is reduced to provide a rectangular shank 14, and mounted upon said shank and retained thereon by a washer 15 and a pin 16 is a head 17 having flat side walls 18. Engaging the flat side walls 18 are resilient flat arms 19 riveted or otherwise connected, as at 20, to the sides of the pole 1. The arms 19 are connected by a coiled retractile spring 21, said spring being arranged between the bolt and the head 17.

The lower end of the harp 6 is connected by chains 13ª to the socket 2, said chains limiting the movement of the harp relative to said socket.

As illustrated by dotted lines in Fig. 2, a flexible casing 22 can be secured to the upper end of the pole 1 to inclose the socket 2, the head 17 and the arms 18, and a cap 23 secured to the harp 6 incloses the upper end of the casing 22. The casing and cap constitute means for preventing the forces of nature from deteriorating or interfering with the operation of the trolley mechanism.

The arms 19 retain the trolley wheel normally in longitudinal alinement with the trolley pole but allow the harp 6 to shift relatively to the pole whereby the wheel 12 can accommodate itself to the curvature of a wire, or the guides of a switch frog.

It is thought that the operation and utility of the trolley will be apparent without further description, and while in the drawing there is illustrated a preferred embodiment of the invention, it is to be understood that the structural elements are susceptible to such variations as fall within the scope of the appended claims.

What I claim is:

1. In a trolley, a pole, a socket carried by the upper end thereof, a harp stem swiveled in said socket, a head carried by the lower end of said harp stem, resilient arms carried by said pole and engaging the sides of said head, a coiled retractile spring connecting said arms, means arranged within the socket of said pole for yieldably supporting said stem therein, and means establishing electrical connection between said harp and stem and said pole at the sides of said pole.

2. In a trolley, a pole, a socket carried by the upper end thereof, a stem swiveled in said socket and capable of vertical movement therein, a harp carried by the upper end of said stem, a spring encircling said stem within said socket and cushioning said harp, a head mounted upon the lower end of said stem and having flat side walls, resilient arms carried by said pole and engaging the flat side walls of said head, and means at the sides of said harp for establishing electrical connection between said harp and said pole.

3. In a trolley, a pole, a socket carried by the upper end thereof, a stem swiveled in said socket and capable of vertical movement therein, a harp carried by the upper end of said stem, a spring encircling said stem within said socket and cushioning said harp, a head mounted upon the lower end of said stem and having flat side walls, resilient arms carried by said pole and engaging the flat side walls of said head, means at the sides of said harp for establishing electrical connection between said harp and said pole, and means carried by said pole and said harp and incasing the harp mechanism.

In testimony whereof I affix my signature in the presence of two witnesses.

TEODORE SCHERBA.

Witnesses:
MAX H. SROLOVITZ,
CHRISTINA T. HOOD.

---

Copies of this patent may be obtained for five cents each, by addressing the "Commissioner of Patents, Washington, D. C."